Oct. 21, 1969
J. L. HULL ET AL
3,473,196
APPARATUS FOR THE TRANSFER AND INJECTION MOLDING OF SYNTHETIC THERMOSETTING AND THERMOPLASTIC RESINS
Filed Oct. 6, 1966
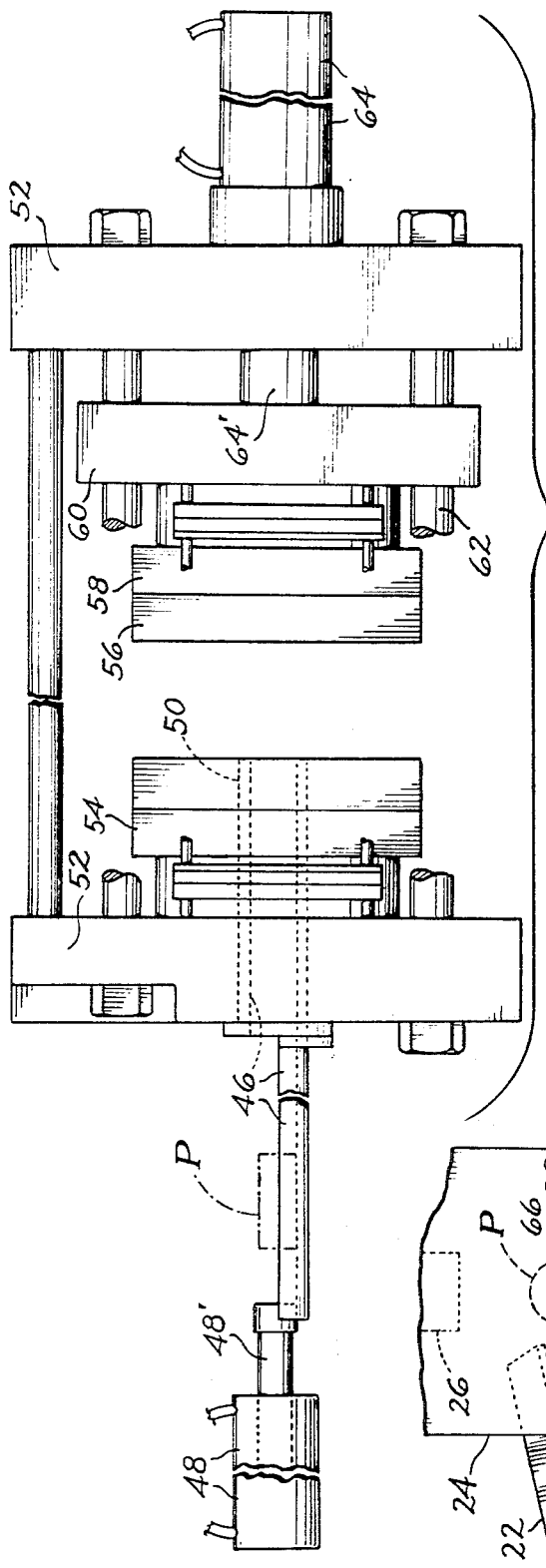
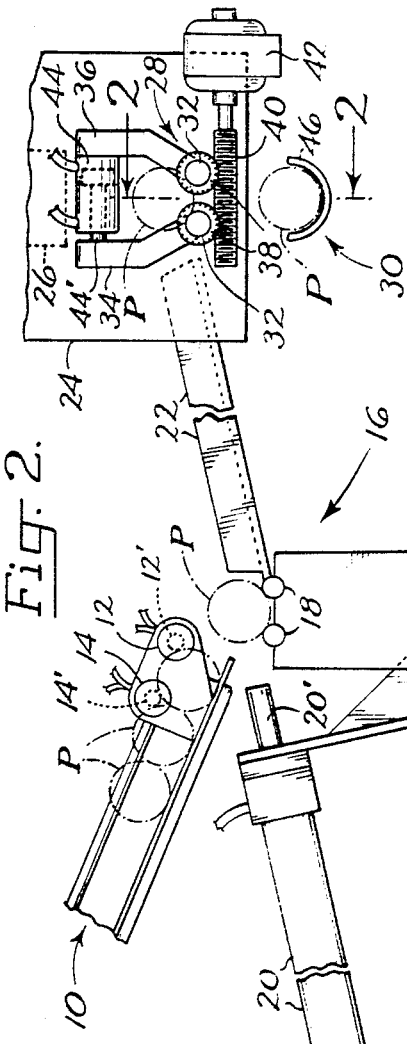
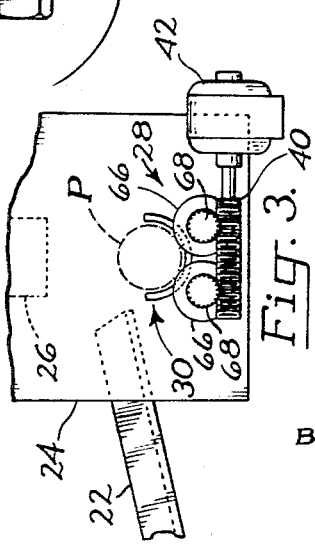
John L. Hull
Kenneth D. Dovey
William T. LaRose, Sr.
John F. Trembley
INVENTORS
BY
Olivier Q. Olson
Agent United States Patent Office 3,473,196
Patented Oct. 21, 1969

3,473,196
APPARATUS FOR THE TRANSFER AND INJECTION MOLDING OF SYNTHETIC THERMOSETTING AND THERMOPLASTIC RESINS
John L. Hull, Ivyland, and Kenneth D. Dovey, Chalfont, Pa., and William T. La Rose, Sr., Troy, and John F. Trembley, Loudonville, N.Y., assignors of fifty percent to Hull Corporation, Hatboro, Pa., a corporation of Pennsylvania, and fifty percent to W. T. La Rose and Associates, Inc., Troy, N.Y., a corporation of New York
Filed Oct. 6, 1966, Ser. No. 584,920
Int. Cl. B29f 1/00, 1/14
U.S. Cl. 18—30
8 Claims

ABSTRACT OF THE DISCLOSURE

A preform of synthetic thermosetting or thermoplastic resin is delivered to a transfer station where it is rotated while being heated substantially to the molding temperature of the resin, and then is transferred to a mold in a time sufficiently short to maintain the resin substantially at said preheated temperature as it enters the mold.

---

This invention relates to the transfer and injection molding of synthetic thermosetting and thermoplastic resins, and more particularly to an apparatus by which to produce molded products of improved physical properties in a much shorter molding cycle than has been attainable heretofore.

The technique of transfer and injection molding has long been used for several known advantages, as compared with conventional compression molding techniques. However, transfer and injection molding apparatuses heretofore provided have involved structural arrangements which impose inherent restrictions on the movement of plastic material through certain stages of processing. Accordingly, such prior apparatuses have not utilized to the fullest extent certain characteristics of the plastic resin by which much shorter time cycles and further improved strength characteristics can be attained.

For example, it has been known that the preheating of a preform of synthetic thermosetting resin functions effectively to reduce the curing time in the mold. However, the mechanisms heretofore provided for transferring the preheated preform from the preheater to the mold have involved time intervals of such magnitude as to incur one or the other of two basic disadvantages: First, if the preform is preheated to a practicable elevated temperature, the resin becomes partially cured before it reaches the mold, resulting in poor quality production. On the other hand, if the preform is preheated only to a temperature at which such partial curing does not occur, excessive transfer ram pressure must be provided even though the reduction in cure time is only minimal.

Accordingly, it is the principal object of the present invention to provide an apparatus by which a preform of synthetic thermosetting resin may be preheated rapidly substantially to its curing temperature and transferred to the mold with a minimum of power and with such speed as to avoid deleterious partial curing and temperature drop before it enters the mold.

Another important object of this invention is the provision of transfer and injection molding apparatus which may be an integrated assembly of components operated automatically on a predetermined time or mechanism sequence to perform all of the functions of providing the preform, delivering it to a preheater, preheating the preform, delivering the preheated preform to mold infeed mechanism, feeding the preheated preform to the mold, curing the resin in the mold, and ejecting the molded product.

A further important object of the present invention is the provision of transfer and injection molding apparatus which is a relatively simplified construction for economical manufacture, maintenance and repair.

The foregoing and other objects and advantages of this invention will appear from the following detailed description, taken in connection with the accompanying drawing in which:

FIG. 1 is a fragmentary foreshortened end elevation of apparatus embodying the features of the present invention, illustrating means for delivering a preform of synthetic resin to a preheater and thence to mold infeed mechanism, both located at a preform transfer station;

FIG. 2 is a fragmentary foreshortened front elevation of the apparatus illustrating means for transferring the preheated preform to a mold; and FIG. 3 is a fragmentary end elevation of the preform transfer station of the apparatus, showing a modified construction thereof.

In its basic concept, the method and apparatus of the present invention involves the delivery of a preform of synthetic thermosetting or thermoplastic resin to a preform transfer station, preheating the preform at said station rapidly substantially to the molding temperature of the resin, transferring the preheated preform rapidly to a mold, subjecting the preheated resin to a predetermined temperature and pressure for a time sufficient to effect setting of the resin, and ejecting the molded product from the mold. For the purpose of this description and the appended claims, reference to molding temperature is intended to define the curing temperature to which thermosetting resins are subjected in the mold and the maximum softening temperature at which preforms of thermoplastic resins may be transferred intact to the mold. Reference to setting of the resin is intended to define the hardening of the resin in the mold, either by the chemical polymerization of the thermosetting resins or by the cooling of the thermoplastic resins.

The method and apparatus of the present invention are operable for all of the many and various types of synthetic thermosetting resins, such as phenolics, melamines, ureas, alkyds, epoxides, diallyl phthalates and others, including those containing glass fiber reinforcement. The method and apparatus of this invention also are operable for the many and various types of thermoplastic resins, such as the vinyl ester resins, polyethylenes, polyamides, polycarbonates, and others, including those containing glass fiber reinforcement. For purposes of this invention this class also includes the urethane elastomers, rubber, and the like.

The preformer may be of any conventional type, and its outfeed may lead directly to a preform delivery chute from which the preform is delivered to a preheater. Alternatively, bulk preforms may be fed by any of various well known feeders to the preform delivery chute, as preferred.

In the drawing, the downwardly inclined preform delivery chute 10 is provided at its lower end with preform metering mechanism. In the embodiment illustrated rather schematically in the drawing, this mechanism comprises a pair of transversely extending preform stop rods 12' and 14' spaced apart longitudinally with respect to the chute. Each of the rods is connected to the piston of an air cylinder 12 and 14, respectively. By appropriate application of air pressure to one side or the other of each piston, its rod either is extended across the delivery chute for abutment by a preform P, or it is retracted from the chute to release the preform for movement by gravity to a preheater delivery station 16. At the preheater delivery station the preform rests upon a pair of laterally spaced rods 18 supported upon a portion of the framework of the apparatus.

Also mounted on this framework, to the rear of the rods 18, is a preform delivery air cylinder 20. Reciprocative within the cylinder is a piston secured in the inner end of a piston rod 20'. The rod projects forwardly from the cylinder for engaging and moving a preform ahead of it. Thus, when air pressure is supplied to the cylinder 20 on the rearward side of the piston therein, the piston rod is extended forwardly, engaging a preform positioned on the spaced rods 18, and moving the preform forwardly up the inclined delivery guide 22. The forward end of this guide terminate adjacent a preform transfer station.

The preform transfer station includes a housing 24 for a preheater 26 and means 28 for supporting a preform for preheating, and mold infeed mechanism 30.

In the embodiment illustrated in FIG. 1, the guide 22 extends into the housing 24 and terminates at its forward end adjacent a pair of longitudinally spaced, transversely extending, parallel rollers 32 upon which the preform is deposited. The metal rollers preferably are covered with nylon, but they may be covered with other non-metallic materials which are not subject to corrosion by the heated preform, which do not tend to stick to the heated preform, and which do not create arcing problems when utilizing high frequency preheating.

The rollers are journaled for rotation in the lower ends of a pair of longitudinally spaced arms 34 and 36, and an extending end of each roller mounts and gear 38 which meshes with a longitudinally extending worm 40. One end of the worm is attached to the output shaft of an electric motor 42, whereby to effect simultaneous rotation of the rollers in the same direction. Accordingly, a preform supported between the rollers is caused to rotate axially, whereby it is heated uniformly throughout its mass by the preheater 26 located above it.

Although various types of preheaters may be employed, it is preferred to use a high frequency preheater. Typical of various electronic preheaters commercially available is the Model No. PPTH—7½ kw. manufactured by W. T. La Rose and Associates, Troy, N.Y.

The upper ends of the spaced arms 34, 36 are interconnected by an air cylinder 44 and its piston rod 44'. Thus, by introducing air under pressure into the cylinder on the side of the piston opposite its rod, both cylinder and rod move outward relative to each other, moving the arms apart. Simultaneously, the rollers 32 move apart as the attached gears 38 roll along the worm 40 in opposite directions. When the rollers are spaced apart a distance greater than the diameter of the preform, the latter falls by gravity from between the rollers to the mold infeed mechanism 30.

At the mold infeed mechanism the preheated preform rests upon a guide channel 46. To the rear of the preform is located the hydraulic cylinder 48 of the preform transfer ram. The piston movable within the cylinder is connected to the elongated piston rod 48' which extends forwardly from the ram and terminates in a ram head registering with the guide channel. Upon application of hydraulic pressure to the rearward side of the piston, the rod and head move forwardly along the guide channel, the head engaging the readward end of the preheated preform P and moving the latter rapidly into the transfer pot 50 of the mold assembly.

The mold assembly is of conventional construction. It includes a pair of spaced fixed bases 52 one of which supports a fixed heated platen 54 which, in turn, supports the mold half containing the transfer pot. The mold sections 56 are mounted upon a heated movable platen 58 supported on the head 60 mounted movably on the supporting rods 62 anchored in the spaced bases 52. Secured to the movable head 60 is the projecting end of the piston rod 64' of a hydraulic clamp cylinder 64 secured to one of the fixed bases 52. Upon application of hydraulic pressure to the outer side of the piston contained movably within the clamp cylinder, the piston rod 64' extends and moves the mold 56 into firm contact with the mold half which includes the transfer pot 50. It will be understood that closing of the mold in this manner is effected prior to or simultaneously with delivery of the preheated preform by the ram 48'.

Clamping pressure supplied by the cylinder 64 is maintained constant at a value considerably greater than the hydraulic pressure supplied to the transfer cylinder 48. Hydraulic pressure supplied to the transfer cylinder is variable, depending upon the synthetic thermosetting resin being processed. In any event, the preheated preform is delivered rapidly to the transfer pot at a temperature only slightly less than the curing temperature of the resin provided at the transfer pot and mold by the heated platens. The preform under pressure from the transfer ram melts and flows into the mold cavity where it is permitted to cure. Thereafter, the clamping ram is retracted to open the mold, the transfer ram being allowed to follow through to assist in ejecting the finished pieces. The transfer ram then is retracted and the molded product is stripped or otherwise ejected, whereupon it falls by gravity to a collecting station, in manner well known in the art.

The transfer ram is capable of transferring the preheated preform from the mold infeed station to the transfer pot in a time of but one second. Transfer time may be increased, by appropriate adjustment of hydraulic fluid delivery to the cylinder, to a few seconds if required. In any event, the preform is preheated substantially to the curing temperature of the resin, and the reduction in such temperature during transfer from the preheater to the mold is quite insignificant. This is achieved, in the embodiment illustrated in FIG. 1, primarily by virtue of the transfer of the preheated preform by gravity from the preform support rollers 32 to the mold infeed guide 46 and the immediate subsequent rapid transfer of the preform to the mold by the transfer ram.

The ability to preheat the preform rapidly substantially to the curing temperature of the resin achieves two primary advantages: First, the semi-fluid state of the preform renders it easily movable by the transfer ram through the guide channel into the transfer pot and further into the mold cavity with a minimum of frictional resistance. Accordingly, the transfer cylinder may be of minimum size and the source of hydraulic pressure may be of minimum capacity, both factors being determined primarily by the range of transfer pressure required at the mold.

Second, with the preform preheated rapidly substantially to the curing temperature at the preheater, followed by extremely fast delivery to the transfer pot, the cure time in the mold is reduced to a minimum without deleterious partial curing of the resin during transfer.

To illustrate the foregoing, the transfer molding apparatus of the present invention, provided with a 75 ton clamping cylinder, a transfer cylinder having a pressure range from 5–20 tons and an electronic preheater of the model previously described, is capable of processing various types of synthetic thermosetting and thermoplastic resins in an overall cycle of no more than 10 seconds. Although other resins require longer curing times, it has been found that the reduction in overall cycle time provided by the apparatus of the present invention represents an output capacity of the apparatus which is from three to more than ten times the output capabilities of compression and transfer molding apparatuses of prior constructions. Moreover, the ability to preheat the preform rapidly substantially to the curing temperature of the resin minimizes mold wear, results in maximum uniformity of product density and dimensional accuracy, with minimum warpage, and increases the dielectric, tensile and flectural strength characteristics of the finished product to such an extent as to render feasible the use of cheaper, lower strength grade materials to achieve the same end physical strength.

The operation of the apparatus illustrated schematically in FIGS. 1 and 2 of the drawing and described hereinbefore, is as follows: To transfer the preform lowermost in the delivery chute 10 the metering cylinder 12 is supplied with air under pressure on the forward side of its piston to retract the stop rod 121 from its position traversing the chute. The lowermost preform thereupon rolls by gravity from the chute and is deposited upon the spaced rods 18 ahead of the transfer ram 20'. The air cylinder 12 now is actuated to extend its stop rod across the lower end of the chute, the adjacent air cylinder 14 then is actuated momentarily to retract its stop rod and allow the next adjacent preform to roll down the chute into abutment with the first named stop rod 12', and then the air cylinder 14 is actuated to extend its stop rod across the chute.

Air under pressure now is delivered to the rearward end of the preform delivery cylinder 20 (the forward end of the cylinder being exhausted to the atmosphere), whereupon the piston rod 20' is projected forwardly, pushing the preform ahead of it up the delivery guide 22 and onto the pair of rotating rollers 32. The piston rod then is retracted to the position illustrated in FIG. 1 by reversing the direction of air pressure, as will be apparent.

As the preform is rotated on its supporting rollers it is heated rapidly and uniformly throughout its mass by the electronic preheater 26 for a predetermined time sufficient to bring it substantially to the curing temperature of the resin. The time required for preheating ranges upward from about 5 seconds, depending upon the type of resin and the size of the preform. Shorter preheating times are obtainable with preheaters providing larger power and higher frequency.

While the preform is being heated, hydraulic pressure is applied to the outer end of the clamping cylinder 64 to move its piston and rod inward and close the mold 56 firmly against the mold half which includes the transfer pot 50, in preparation for receiving the plastic charge.

Immediately upon attainment of the desired preform temperature, the air cylinder 44 is activated to move the arms 34, 36 and the supported rollers 32 apart sufficiently to allow the preform to drop by gravity downward between them onto the delivery guide 46 ahead of the transfer ram.

Immediately upon deposit of the preheated preform in the guide, hydraulic pressure is applied to the outer end of the transfer cylinder 48. The transfer ram head thus is projected forward rapidly, engaging the preform and moving it quickly into the transfer pot. This phase of the cycle requires from one to but a few seconds of time, and therefore the preheated resin does not cure to any deleterious extent during transit and its temperature is not reduced significantly below the curing temperature. Moreover, because of the semi-fluid state of the preheated preform, it moves with minimum friction through the guide 46 and into the transfer pot and further into the mold cavity.

In the embodiment illustrated in FIG. 3 the preform is delivered directly to the mold infeed mechanism rather than to the retractable roller assembly illustrated in FIG. 1. At the preform transfer station that portion of the transfer guide 46 is made of nonmetallic material, such as Teflon, to avoid the problems of arcing when using the high frequency preheater. A pair of spaced rollers 66, covered with nylon or other suitable material, are mounted adjacent the guide 46. The rollers project through openings in the guide sufficiently to support a preform between them. The rollers support gears 68 at one end meshing with the form 40 driven by the electric motor 42, as in the embodiment of FIG. 1.

The embodiment illustrated in FIG. 3 thus further minimizes the transit time of the preheated preform to the mold, by eliminating the time involved in the embodiment of FIG. 1 in retracting the rollers 32 and transferring the preheated preform by gravity to the guide channel 46.

It will be apparent from the drawing that sequential operation of the various components of the apparatus may be controlled automatically by very simplified means. For example, electric circuits for the roller drive motor 42, the electronic preheater 26 and the electric heaters for the mold platens 54, 58 may be provided simply with manually operated on-off switches, the circuits being energized continuously when the apparatus is in use. The conduits connecting each air cylinder to a source of air under pressure may simply include solenoid-actuated valves of well known construction to control the supply of air pressure to and from the exhaust from opposite sides of the piston in the cylinder. In similar manner, the conduits connecting the hydraulic transfer cylinder and the clamping cylinder to sources of hydraulic pressure may include solenoid-actuated valves for controlling a delivery and exhaust of hydraulic pressure to and from opposite sides of the piston in each cylinder. The electric circuit for each solenoid may include an appropriately timed and sequenced switch, for example by a switch of a multiple switch timer, many types and varieties of which are well known in the art.

It will be apparent to those skilled in the art that various changes and modifications may be made in the size, shape and arrangement of parts described hereinbefore. For example, the nylon or other preform supporting rollers need not be arranged to rotate, although rotation of the preform is preferred to provide maximum uniformity of preheating throughout the mass of the preform. If rotation is desired, only one of the pair of rollers need be driven rotationally, the other roller being provided as an idler. Various means other than the air cylinder 44 illustrated may be employed to retract the rollers from each other to allow the preheated preform to fall by gravity to the infeed station. One of the rollers may be fixed in position, with the other roller being retractable therefrom to effect release of the preform.

Mechanism may be incorporated in the apparatus of FIG. 1 for delivering the preheated preform from the rollers 32 to the guide channel 46 in a time faster than afforded by gravity. For example, a spring or air actuated delivery ram may be used to accelerate the delivery of the preform upon retraction of the rollers.

The preheater may be located at a transfer station directly over, or otherwise immediately adjacent the press mold, and the preheated preform transferred by gravity or by other still faster means directly into the mold, to reduce still further the transit time to the mold.

The foregoing and other modifications may be made as desired without departing from the spirit of this invention and the scope of the appended claims.

Having now described our invention and the manner in which it may be used, what we claim as new and desire to secure by Letters Patent is:

1. In transfer and injection molding apparatus for molding synthetic thermosetting and thermoplastic resins and including a mold and preform guide means communicating directly with the mold for guiding a preform supported on the guide means directly to the mold, the combination therewith of (a) rotary preform support means immediately adjacent the guide means, (b) preform infeed means terminating adjacent the support means for delivering a preform to the rotary support means, (c) preform preheater means adjacent the support means for preheating a preform while it is rotating on the support means, and (d) movable transfer means operatively associated with the support means and guide means for moving a preheated preform from the support means onto the guide and thence along the guide means directly into the mold.

2. The combination of claim 1 wherein the rotary preform support means comprises rollers, and drive means engages at least one of the rollers for rotating the latter.

3. The combination of claim 1 wherein the movable transfer means includes
   (a) movable mounting means supporting the rotary preform support means above the guide means, and
   (b) operator means engaging the mounting means for moving the latter to release a preheated preform on the support means for gravity transfer to the guide means.

4. The combination of claim 3 wherein the rotary preform support means comprises a pair of rotary support members, and the movable mounting means supports said support members for relative movement by the operator means between an operative position for supporting a preform between them and a release position spaced apart sufficiently to allow the preform to drop between them onto the guide means.

5. The combination of claim 1 wherein the rotary preform support means is mounted on the guide means, and the movable transfer means comprises reciprocative ram means movable in the direction of the guide means between a retracted position outward of the preform support means and an extended position adjacent the mold.

6. In transfer and injection molding apparatus for molding synthetic thermosetting and thermoplastic resins and including a mold, mold infeed means, and a preform transfer station for transferring a preform to the mold infeed means, the combination therewith of
   (a) a preform preheater immediately adjacent the preform transfer station for preheating the preform substantially to its molding temperature,
   (b) movable rotary support means positioned in heat-receiving relationship with the preheater and above the mold infeed means for releasably supporting a preform for preheating by the preheater while rotating the preform,
   (c) means for delivering a preform to the rotary support means for preheating by the preheater to said temperature, and
   (d) means engaging the support means for moving the latter to release the preform for gravity transfer to the infeed means.

7. The combination of claim 6 wherein
   (a) the movable rotary support means comprises a pair of spaced rotary support members adapted to support a preform thereon, and
   (b) means mounting at least one of the support members for adjustable movement toward and away from the other support member for releasing a preform downward therebetween.

8. The combination of claim 6 wherein the rotary support means comprises rollers, and drive means engages at least one of the rollers for rotating the latter.

References Cited

UNITED STATES PATENTS

| 2,327,079 | 8/1943 | Wacker. |
| 3,098,695 | 7/1963 | Jurgeleit. |
| 3,191,234 | 6/1965 | Hendry. |
| 2,287,277 | 6/1942 | Ryder. |

FOREIGN PATENTS

| 4,734 | 4/1964 | Japan. |

WILBUR L. McBAY, Primary Examiner

U.S. Cl. X.R.

214—340; 263—6; 264—328